United States Patent [19]
Mason

[11] Patent Number: 5,163,873
[45] Date of Patent: Nov. 17, 1992

[54] COUPLINGS FOR AND METHODS OF COUPLING DRIVING ELEMENTS TO DRIVEN ELEMENTS

[75] Inventor: James A. Mason, Leesburg, Fla.

[73] Assignee: Electro-Archimedes, Ltd., Roscoe, Ill.

[21] Appl. No.: 692,690

[22] Filed: Apr. 29, 1991

[51] Int. Cl.⁵ .................. F16D 27/00; F16D 3/52; F16D 37/00

[52] U.S. Cl. .................. 464/29; 192/84 T; 464/59

[58] Field of Search ............ 464/29, 7, 30, 35, 36, 464/57, 59, 60, 185; 310/75 D, 78; 192/84 T, 35, 81 C, 65, 105 A, 105 B; 188/67, 72.7, 82.84

[56] References Cited

U.S. PATENT DOCUMENTS

| | | | |
|---|---|---|---|
| 2,012,509 | 8/1935 | Hoddy | 310/78 |
| 2,290,513 | 7/1942 | Wemp | 192/105 A |
| 3,117,660 | 1/1964 | Dodwell | 192/41 |
| 3,149,705 | 9/1964 | Shoquist | 192/35 |
| 3,149,706 | 9/1964 | Mason et al. | 192/35 |
| 3,177,995 | 4/1965 | Mason | 192/35 |
| 3,177,996 | 4/1965 | Bates | 192/35 |
| 3,270,845 | 9/1966 | Dodwell | 192/81 C |
| 3,319,754 | 5/1967 | Kokochak et al. | 192/105 A |
| 3,412,833 | 11/1968 | Lang | 192/81 C |
| 3,460,658 | 8/1969 | Badin | 192/105 A |
| 3,550,736 | 12/1970 | Lang | 192/81 C |
| 3,565,221 | 2/1971 | Halilovic | 192/105 A |
| 3,865,222 | 2/1975 | Briar | 464/29 |

FOREIGN PATENT DOCUMENTS 1267375 6/1961 France .............. 192/81 C

Primary Examiner—Daniel P. Stodola
Assistant Examiner—Tony A. Gayoso
Attorney, Agent, or Firm—Charles M. Kaplan

[57] ABSTRACT

Apparatus and methods of coupling rotating elements employ a magnetically triggered constricting spiral coil that exerts only radial forces to transmit torque through unrestrained unattached universally movable spheres.

42 Claims, 2 Drawing Sheets

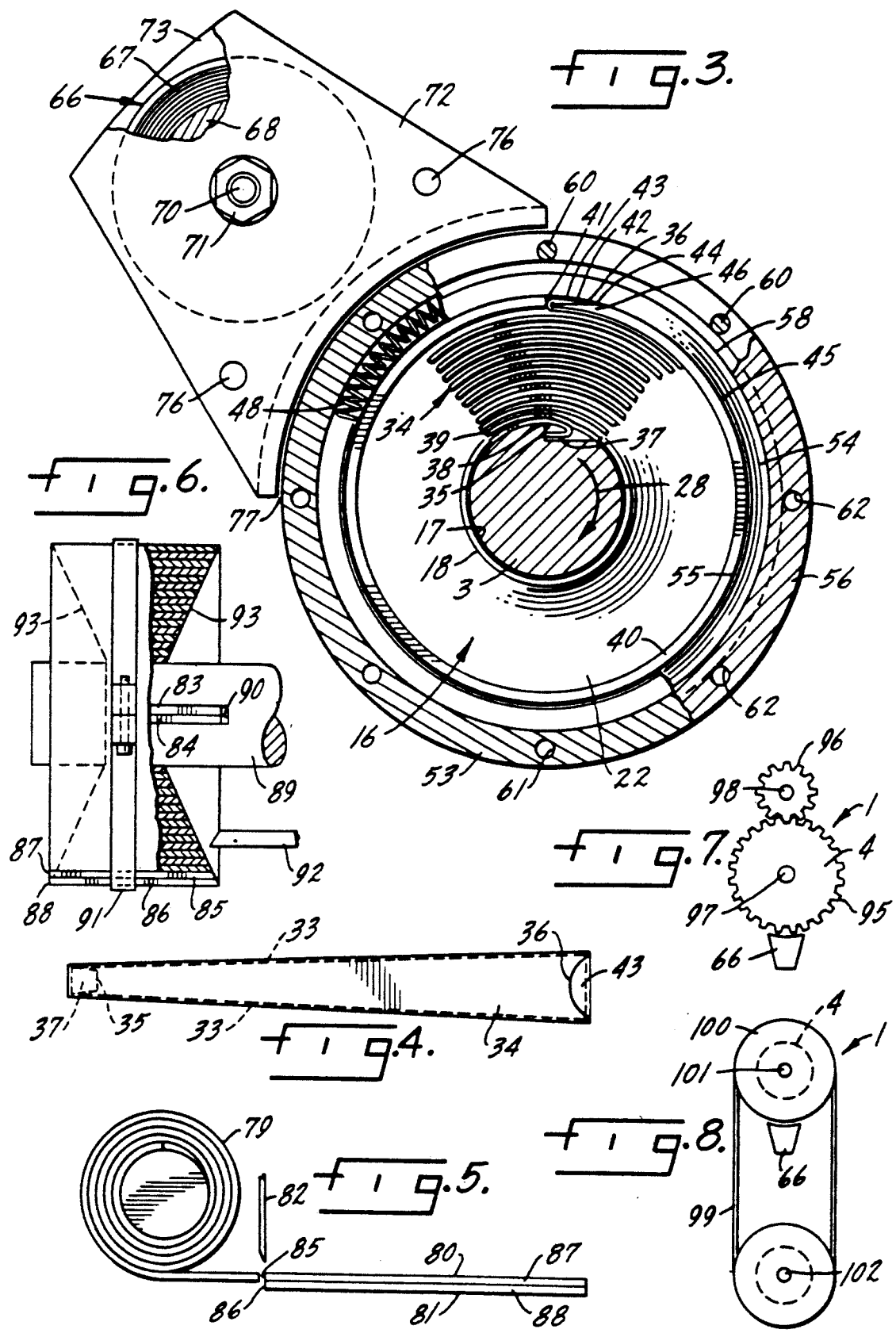

COUPLINGS FOR AND METHODS OF COUPLING DRIVING ELEMENTS TO DRIVEN ELEMENTS

BACKGROUND OF THE INVENTION

This invention relates to couplings and methods for transmitting motion and power from one part to another, and more particularly to collect couplings and methods that clamp or grip a rotatable shaft while transferring power from or to such a shaft. Prior couplings for rotatable shafts have been deficient in that they produced too much heat, used keys or splines that caused backlash, or were difficult to align. Also, prior couplings that required thrust bearings took up so much space that their use was limited. When magnetic triggering was employed, prior devices used an electromagnetic coil that fully encircled part of the apparatus.

OBJECTIVES OF THE INVENTION

Accordingly, it is an object of this invention to provide improved coupling methods and apparatus.

Another object is to provide a coupling for rotatable shafts that does not use keys or splines.

Another object is to provide a coupling that can fit inside of a gear or sheave.

Another object is to provide a coupling for connecting aligned shafts that automatically centers the shafts.

Another object is to provide an electromagnetic triggering device that occupies less than a ninety degree sector of a circular coupling.

Another object is to provide a coupling for rotatable shafts that does not require special tools for disengaging a coil.

Another object is to provide couplings and methods of coupling that can be controlled by computer to shift gears or to hold the speed of a pair of shafts to within a predetermined narrow range.

Another object is to provide couplings and methods of coupling that grip a rotating shaft with only radial forces, so that thrust bearings for axial forces are not needed.

Another object is to activate a coupling with a small magnetic force that is magnified many times.

Another object is to prevent damage caused by violent unwinding of a coil or by reverse rotation of the coil of a coupling.

Another object is to prevent malfunctioning of a coupling from accumulation of residual magnetic energy caused by repeated hysteresis looping.

Another object is to provide magnetically triggered methods and couplings for rotating shafts that use a constricting spiral to impart radial forces to a multitude of small force transmitting members, with the couplings being relatively inexpensive, durable, easy to maintain, and which do not posses defects found in similar prior art devices and methods.

Other objects and advantages of the invention will be apparent from the specification and claims, and the scope of the invention will be set forth in the claims.

DESCRIPTION OF THE DRAWING

FIG. 3 is a partially broken cross sectional view taken along the line 3—3 in FIG. 2.

FIG. 4 is a schematic plan view of the coil.

FIG. 5 is a schematic side view showing steps in the making of the coil.

FIG. 6 is a schematic partially cross sectional view showing steps in the making of the coil.

FIG. 7 is a schematic representation of another embodiment of the invention.

FIG. 8 is a schematic representation of still another embodiment of the invention.

DESCRIPTION OF THE INVENTION

Figure 1:
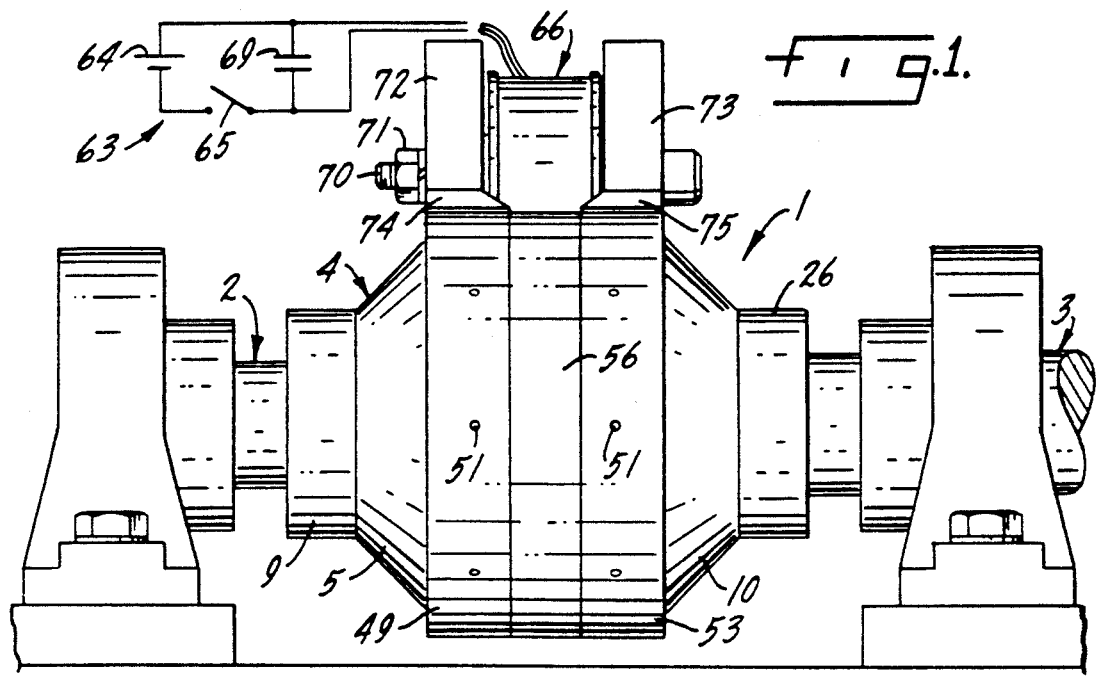
FIG. 1 is a schematic side view of an embodiment of the invention.
Figure 2:
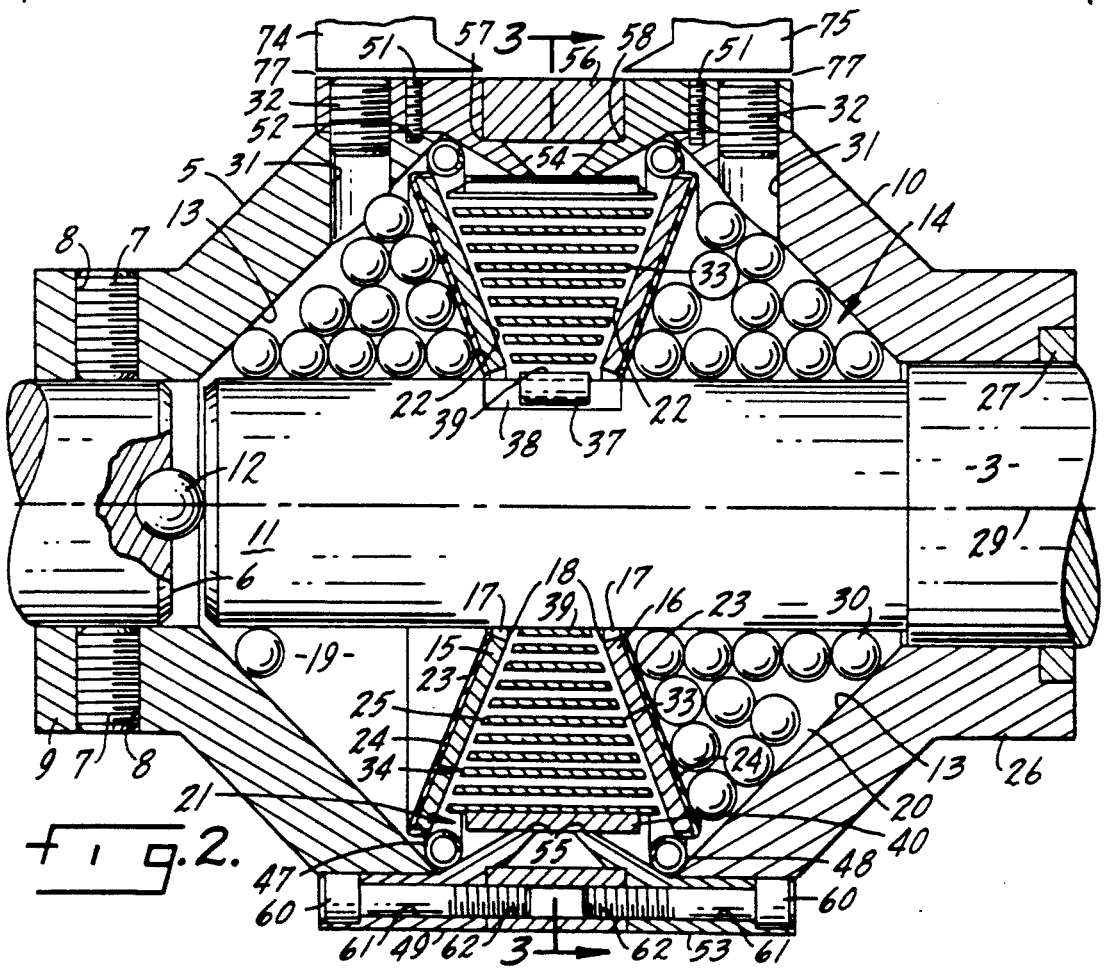
FIG. 2 is an enlarged cross sectional view of the coupling shown in FIG. 1 with some spheres omitted for clarity.

The drawing illustrates coupling methods and a coupling 1 in accord with this invention for transferring motion and power from a cylindrical driving shaft or element 2 to a coaxial cylindrical driven shaft or element 3, with the shafts being supported in conventional manner in pillow blocks. Hollow housing means 4 has a first shell portion 5 that is attached to an end 6 of shaft 2 by set screws 7 threaded through tapped holes 8 in a cylindrical end collar 9 that fits closely around shaft 2. Housing 4 has a second shell portion 10 that surrounds an end 11 of shaft 3 which is located close to end 6. Shaft ends 6 and 11 may be separated by a ball bearing 12. The interior of housing 4 has a pair of conical walls 13 that face each other and define a closed chamber 14 which communicates with the outer surface of shaft 3. Walls 13 are centered on and define angles of about forty-five degrees with the center axis 29 of shafts 2 and 3. Shell portions 5 and 10 are made from non-magnetic material such as aluminum.

Shaft 3 passes through a pair of tapered force transmitting components 15 and 16, each of which is a segment of a right circular cone having a circular hole 17 centered on its vertex for receiving the shaft. The apex ends 18 of components 15 and 16 are adjacent each other. Components 15 and 16 divide the interior of housing 5 into two essentially identical symetrical tapered cavities 19 and 20 of equal volume that are separated by a tapered cell 21. The outside surfaces 22 of components 15 and 16 define walls or sides of cell 21 and their inside surfaces 24 define walls or sides of cavities 19 and 20. The inside surfaces 24 define an angle of sixty seven and one-half degrees with center axis 29. Surfaces 24 may be coated with polyurathane plastic 23 to compensate for minor misalignment of parts and to enhance the ability of coupling 1 to handle reverse torque that occurs when the driven shaft becomes the driving shaft. Since shaft 3 is not always engaged by coupling 1, the other end of housing 4 has a cylindrical end collar 26 on shell portion 10 sized to receive shaft 3 for relative rotation, and a conventional annular bearing 27 for supporting the shaft. Shafts 2 and 3 rotate in the direction indicated by arrow 28.

Cavities 19 and 20 each contain essentially the same number of unrestrained unattached universally movable members or spheres 30 which provide the coupling medium through which the rotation of the driving shaft is transmitted to the driven shaft. The volume of each sphere 30 is a small fraction of the volume of chamber 14, and preferably is less than one percent of the volume of chamber 14. The spheres 30 may be loaded into cavities 19 and 20 through tapped holes 31 on opposite sides of housing 4. Holes 31 are closed by screw plugs 32. The spheres 30 are packed into cavities 19 and 20 but never the less are free to move and to rotate in any direction, and the spheres 30 may migrate or change their locations within the cavities. Preferably the spheres 30 all have the same diameter and may be the solid steel pellets 0.177 inches (4.5 mm) in diameter known as the BB's fired by air guns. None of the spheres 30 should be small enough to escape from cavities 19 and 20 through the spaces or clearances that communicate with the cavities, and chamber 14 should contain lubricating oil.

A tapered coil 34 is spirally wrapped in successive radial layers around shaft 3 from its smaller radially innermost terminal end 35 to its larger radially outermost terminal end 36. Coil 34 approximates a spiral of Archimedes that has been wound in the direction opposite to the direction of rotation of the shafts. End 35 is removably attached to shaft 3 by a bent back tab 37 that enables end 35 to abutt against a ledge 38 that has been cut in the shaft. The single radially innermost layer 39 is the only layer of coil 34 capable of contacting the shaft and may touch itself at tab 37. Layer 39 is located radially inwardly from components 15 and 16, but this layer and components 15 and 16 do not touch. FIG. 4 shows what coil 34 would look like if it were unwound and laid out flat. The opposite side edges 33 of coil 34 are chamferred so that each edge defines a portion of a conical surface 25 that has the same angle and mates with the outside surface 22 of one of the conical components 15 or 16.

A split ring 40 made from magnetic steel of uniform width and thickness encircles coil 34 and has facing terminal ends 41 and 42. End 36 of the coil is bent backward to define a flap 43 that overlaps the coil and extends in a direction opposite to the remainder of the spiral defined by the coil. Flap 43 and the radially outermost surface of coil 34 define a connecting slot 44 into which end 42 extends. The radially outer surface 45 of ring 40 defines the maximum diameter of the ring, and the connection between coil 34 and ring 40 should have essentially the same maximum diameter. To accomplish this, a portion 46 of ring 40 adjacent end 42 is tapered to a dimension less than the maximum diameter of the ring, and tab 43 is tapered so that its outermost surface is essentially the same as the maximum diameter of the ring. The width of ring 40 should be less than the width of the radially outermost layer of coil 34. A pair of identical coiled springs 47 and 48 inside of cavities 19 and 20 surround conical components 15 and 16 and hold the components in place. This prevents the conical components from being forced askew by centrifugal force and becoming entangled with layers of coil 34.

A magnetic flux transmitting collar 49 is attached to sheel portion 5 by screws 51 that pass through holes in the collar and are threaded into tapped holes 52 in shell portion 5. An identical collar 53 is attached to shell portion 10 in the same way. Each of the collars has an integral circular projection 54 that tapers to a relatively narrow terminal edge 55 that extends radially inwardly toward shaft 3 into contact with split ring 40. Edges 55 are spaced axially from each other, and the combined width of both edges 55 should be much less than the width of split ring 40, and preferably is less than one-third of the width of the ring. A cylindrical hoop 56 located between collars 49 and 53 is made from a material, such as aluminum or plastic, that does not conduct magnetic flux. Hoop 56 has radially inner corners or edges 57 that fit into mating circular grooves 58 on facing surfaces of collars 49 and 53. Housing 4 is held together by screws 60 that pass through uniformly spaced openings 61 in collars 49 and 53 and are threaded into mating tapped holes 62 in hoop 56.

The operation coupling 1 is controlled by an electromagnetic circuit 63 which includes a source of direct current 64, a switch 65 that opens and closes the circuit, an electromagnet 66 having windings 67 and a core 68, and a capacitor 69 connected in parallel with windings 67. Electromagnet 66 may be held together by a bolt 70 and nut 71 between two separated frames 72 and 73 that define identical poles 74 and 75. The width of poles 74 and 75 should be approximately the same as the axial width of collars 49 and 53, and electromagnet 66 may be supported by fasteners 76 in any conventional manner to provide a small air gap 77 between the corresponding poles and collars. As shown in FIG. 3, poles 73 and 74 are curved to correspond to the curvature of collars 49 and 53, and the poles extend for less than ninety degrees around the circumference of housing 4. The inductance of the coupling should be predetermined, and capacitor 69 should be balanced with the inductance so that the capacitor cancels the residual magnetic energy resulting from hysteresis looping when switch 65 is opened and neutralizes accumulated hysteresis.

The operation of coupling 1 and the methods of coupling are triggered when switch 65 is closed. This energizes electromagnet 66 causing magnetic flux to flow from poles 74 and 75 through air gaps 77 into collars 49 and 53. This causes collar edges 55 to act as magnets that rotate split ring 40 in a direction counter to the direction of rotation of shaft 3, and this constricts coil 34 radially inwardly toward shaft 3. As shown in FIG. 3, movement of end 42 of ring 40 in a counter clockwise direction pulls tab end 43 of the coil in the same direction while ledge 38 prevents end 35 from moving relative to shaft 3; this causes the coil to constrict. Constriction of coil 34 causes the layers of the coil to move radially inwardly toward shaft 3. The radially innermost layer 39 is the first layer that is moved inwardly by the constriction. The number of layers that constrict depends on how much torque is transmitted from one shaft to the other with the layers winding radially inwardly from the inner layers to the outer layers with the innermost layers being the first to constrict and the radially outermost layer being the last to constrict. The layers of coil 34 are always separated from each other. Constriction of coil 34 causes its chamferred edges 33 to move radially inwardly toward shaft 3; this causes conical surfaces 25 to push against the mating outside surfaces 22 of force transmitting conical components 15 and 16. This forces components 15 and 16 in opposite directions axially along shaft 3 and decreases the volume of cavities 19 and 20 so as to squeeze spheres 30 against the outer surface of shaft 3 and against the conical surfaces 13 of housing 4. As spheres 30 are compressed, they adjust their relative positions in cavities 19 and 20 and rotate at varying speeds depending on the number of layers of coil 34 that constrict, and this determines the amount of torque and motion transferred from one shaft to the other. Compression of spheres 30 causes conical components 15 and 16 to rotate in the direction of rotation of shaft 2. This rotation causes the layers of coil 34 that are in contact with components 15 and 16 to attempt to constrict further; this produces greater binding of the layers of coil 34 against components 15 and 16 that eventually locks the coil and components together. Unexpectedly, when the axial movement of conical components 15 and 16 is transferred to shaft 3 through the multitude of spheres 30, only radial forces act on shafts 2 and 3 so thrust bearings are not required. It is hypothesized that axial forces do not occur because the multitude of small spheres 30 are wedged between opposing slanting surfaces 13 and 24, and therefore the spheres only move radially. When switch 65 is opened, edges 55 no longer act as magnets. This allows the tension in coil 34 to rotate ring 40 clockwise so the coil expands to or toward its original configuration, and components 15 and 16 move toward each other and spheres 30 release their grip on shaft 3.

As shown in FIGS. 5 and 6, this invention also includes methods of making spiral coil 34 in which two identical coils 34 are machined simultaneously. A pair of strips 80 and 81 of equal length are severed by a cutter 82 from a supply 79 of material such as steel band strapping that has a uniform width and thickness. The strips 80 and 81 are placed in contact with each other in overlapping relationship with their corresponding first terminal ends 83 and 84, second terminal ends 85 and 86 and their side edges 87 and 88 coextensive. First terminal ends 83 and 84 are then attached to mandril 89 by inserting them into a slot 90 milled in the mandril. The entire length of the strips is then wrapped in successive layers around the mandril with the second terminal ends 85 and 86 being located in the outermost layers. The wound strips are then encircled by a band clamp 91 that is tightened against the outer layer to hold the layers in fixed wrapped position on mandril 89 with the side edges 87 and 88 exposed. The mandril is then rotated and one set of corresponding side edges is machined in conventional manner with a cutting tool 92 to uniformly decrease the width of the strips from outermost layers 85 and 86 radially inwardly toward mandril 89 and thereby to define a conical surface 93 with the machined edges. The machining process may then be repeated on the opposite side edges 87 and 88 of the strips to produce a second conical surface 93 identical to the first surface 93 as indicated in phantom in FIG. 6. The strips 81 and 82 should then be heat treated so that they will retain their shape as a coil 34 that approximates a spiral of Archimedes. The coils may then be removed from mandrill 89 by sliding clamp 91 off of them and pulling first ends 83 and 84 out of slot 90. The coils are then slid axially relative to each other until they are out of contact. Each coil is then trimmed and bent at its ends to form a tab 37 and flap 43. If stretched out flat, each coil 34 would be shapped as shown in FIG. 4.

It has thus been shown that by the practice of this invention, coupling 1 and the methods of coupling disclosed are suitable for employing a computer to open and close switch 65 to hold the relative speed of shafts 2 and 3 within a narrow range. Since spheres 30 permit only radial forces to result from constriction of coil 34 toward shaft 3, axial thrust bearings are not required. The triggering force of electromagnet 66 on split ring 40 needs to be only a small fraction of the total force required to fully constrict coil 34 because as ring 40 is turned counterclockwise in FIG. 3, the magnetic force is multiplied about ten times for every layer of the coil surrounding shaft 3. Thus, electromagnet 66 needs to occupy a sector of not more than ninety degrees. As shown in FIG. 7, the small size of electromagnet 66 and the elimination of the need for thrust bearings permit housing 4 to have integral gear teeth 95 that mesh with another element or gear 96 for coupling shafts 97 and 98 in the manner described above. Similarly, FIG. 8 shows that the small size of electromagnet 66 permits it to be located within the confines of a V-belt 99. The exterior of housing 4 is grooved so that coupling 1 is within an element or sheave 100 that couples shafts 101 and 102. Also, coupling 1 is self centering in that the action of spheres 30 alignes shafts 2 and 3. By balancing the capacitance of capacitor 69 with the inductance of the system, repeated hysteresis looping is prevented, and the sparking and malfunctions caused by inductance build up do not occur. Shaft 3 and coil 34 can be connected and disconnected simply by moving edge 35 into and out of abuttment with ledge 38, so special purpose tools are not required. This loose connection also reduces wear on coil 34.

While the present invention has been described with reference to a particular embodiment, it is not intended to illustrate or describe herein all of the equivalent forms or ramifications thereof. For example, shaft 3 could be the driving shaft and shaft 2 the driven shaft. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. A coupling for connecting a rotatable driving element to a rotatable driven element, one of said elements being a circular shaft having a center axis, comprising: means for defining a chamber that receives the other of said elements, said means for defining a chamber surrounding said shaft so as to define a chamber communicating with said shaft, a plurality of unattached universally movable spheres within said chamber, and means for forcing said spheres to move radially inwardly toward said center axis of said shaft and also to move axially into contact with said means defining a chamber so as to couple said driving element to said driven element, said means for forcing said spheres being unattached to any other part of said coupling and being movable axially along said shaft, said means for forcing said spheres having a circular hole through its center, and said shaft passing through said circular hole.

2. The coupling defined in claim 1, wherein said means for forcing said spheres comprises a pair of identical force transmitting components that are movable axially along said shaft.

3. The coupling defined in claim 2, further comprising means for moving said force transmitting components axially away from each other so as to decrease the volume of said chamber and thereby squeeze said spheres into coupling engagement with said driving and driven elements.

4. The coupling defined in claim 3, wherein each of said force transmitting components is a segment of a cone having a center hole through which passes said shaft, and such conical components have their apex ends adjacent each other.

5. The coupling defined in claim 4, further comprising said conical components dividing said chamber into a pair of essentially identical cavities of essentially equal volume.

6. The coupling defined in claim 1, wherein said spheres fill said chamber.

7. A coupling for connecting a rotatable driving element to a rotatable driven element, one of said elements being a circular shaft having a center axis, comprising: means for defining a chamber that receives the other of said elements, said means for defining a chamber surrounding said shaft so as to define a chamber communicating with said shaft, a plurality of unattached universally movable spheres within said chamber, and means for forcing said spheres to move radially inwardly toward said center axis of said shaft and also to move axially into contact with said means defining a chamber so as to couple said driving element to said driven element, said means for forcing said spheres being unattached to any other part of said coupling, said means for forcing said spheres comprising a coil having one end coupled to said shaft, said coil having layers spiralling radially outwardly around and away from said shaft, said coil spiralling radially outwardly from said one end to an opposite end of said coil, said one end being radially closer to said shaft, said other end being radially farthest from said shaft, each of said layers being at a different radial distance from said shaft that increases from said one end to said other end, and said layers always being separated from each other.

8. The coupling defined in claim 7, wherein said coil comprises a tapered strip that increases in width from said one end to said opposite end, said strip has tapered opposite edges, and each of said edges defines a portion of a conical surface that is coaxial with said shaft, a split ring of magnetic material having one end connected to said opposite end of said coil, magnetic means for moving said one end in a direction that causes said coil to constrict radially inwardly toward said shaft, said magnetic means comprising an electromagnet having a core and windings oriented to move an end of said split ring, a source of direct current connected to said windings, and a switch for controlling flow of direct current to said windings.

9. The coupling defined in claim 8, wherein said magnetic means has a predetermined inductance, a capacitor is connected to said source in parallel with said windings, and said capacitor is matched to said inductance so as to cancel residual inductance when said switch is opened.

10. The coupling in claim 7, further comprising a pair of conical components each having a center hole through which passes said shaft, said conical components having their apex ends adjacent each other, each conical component having its outside surface facing a conical surface defined by one edge of said coil, and means for constricting said coil toward said shaft and thereby causing said edges of said coil to contact said conical components and force said components axially along said shaft away from each other.

11. The coupling defined in claim 7, further comprising magnetic means for moving said opposite end of said coil in a direction that causes said coil to constrict radially inwardly toward said shaft.

12. The coupling defined in claim 11, further comprising a component surrounding said shaft having one surface that is contacted by said coil as it constricts, and an opposite surface for contacting said spheres, constriction of said coil moving said opposite surface of said component axially along said shaft toward said means for defining a chamber.

13. A coupling for connecting a rotatable driving element to a rotatable driven element, one of said elements being a circular shaft having a center axis, comprising: means for defining a chamber that receives the other of said elements, said means for defining a chamber surrounding said shaft so as to define a chamber communicating with said shaft, a plurality of unattached universally movable spheres within said chamber, and means for forcing said spheres to move radially inwardly toward said center axis of said shaft and also to move axially into contact with said means defining a chamber so as to couple said driving element to said driven element, said means for forcing said spheres being unattached to any other part of said coupling and comprising a pair of axially movable conical components each having a center hole through which passes said shaft, said conical components having their apex ends adjacent each other, and each conical component having its outside surface facing radially movable means that contacts such outside surfaces of said conical components and forces said conical components to move axially along said shaft away from each other.

14. A coupling for connecting a rotatable driving element to a rotatable driven element, one of said elements being a shaft, comprising:
A. a coil having its radially innermost terminal end coupled to said shaft, said coil being spirally wraped in successive radial layers around said shaft from one end that is radially closest to said shaft to an opposite end which is radially farthest from said shaft, each of said layers being at a different radial distance from said shaft that increases from said one end to said farthest end, successive layers of said coil in a direction radially outwardly away from said shaft increasing in width in a direction axially of said shaft so that an edge of said coil defines a conical surface;
B. a movable conical component for activating a coupling medium, said movable conical component having a center hole through which said shaft is received, said movable conical component having a conical surface mating with said conical surface of said coil, said movable conical component being movable axially along said shaft, and said conical component being unattached to any other part of said coupling;
C. a universally movable coupling medium for transmitting rotation of said shaft to the other of said elements, said coupling medium being moved and activated by movement of said movable conical component axially along said shaft; and
D. means for constricting said coil radially inwardly toward said shaft and contracting said edge of said coil radially inwardly toward said shaft to thereby force said edge against said mating surface of said movable conical component so as to move said movable conical component axially along said shaft and thereby move and activate said coupling medium.

15. The coupling defined in claim 14, wherein said coil comprises a single unitary strip of material wound to approximate a spiral of Archimedes, and said layers are radially spaced and out of contact with each other at all times.

16. The coupling defined in claim 14, wherein said means for constricting said coil radially inwardly toward said one shaft comprises a split ring of magnetic material surrounding said coil, said split ring having one of its ends connected to the radially outermost end of said coil, and magnetic means for rotating said one end of said split ring in a direction opposite to the direction of rotation of said shaft so as to constrict said coil radially inwardly toward said one shaft.

17. The coupling defined in claim 16, wherein said magnetic means comprises an electromagnet having a core and windings oriented to rotate an end of said split ring, a source of direct current connected to said windings, a switch for controlling flow of direct current to said windings, and a capacitor connected to said source in parallel with said windings.

18. The coupling defined in claim 17, wherein said magnetic means has a predetermined inductance and said capacitor is matched to said inductance so as to cancel residual inductance when said switch is opened.

19. The coupling defined in claim 14, wherein said coil has a terminal end portion that is bent backward in a direction opposite to the remainder of the spiral defined by said coil.

20. The coupling defined in claim 14, wherein said coupling comprises wall means defining a chamber around said shaft and said coupling medium comprises a plurality of unattached universally movable spheres confined within said chamber.

21. The coupling defined in claim 14, wherein said coil has opposite edges which define a pair of conical surfaces and said movable conical component comprises a pair of identical conical components having outside conical surfaces that mate with said conical surfaces of said coil, constriction of said coil forcing said conical surfaces of said coil against said outside conical surfaces of said components and moving said components axially along said shaft away from each other, said conical components rotating and binding against said coil until they are locked thereto.

22. The method of coupling a driving element to a driven element, one of said elements comprising a rotatable shaft, comprising the steps of:
   A. surrounding a portion of said shaft with a pair of walls so as to form a chamber of predetermined volume that encloses said portion;
   B. confining a plurality of unattached universally movable spheres within said chamber;
   C. connecting one of said walls to the other of said elements;
   D. encircling said shaft with a spiral coil having a plurality of layers that spiral radially outwardly around each other at increasingly greater radial distances from said shaft; and
   E. decreasing the volume of said chamber by constricting said coil radially inwardly toward said shaft into contact with the other of said walls so as to move said other wall axially along said shaft and thereby to squeeze said spheres together until they transmit force from said driving element to said driven element.

23. The method of coupling defined in claim 22, further comprising maintaining said layers of said coil separated from each other at all times.

24. The method of coupling defined in claim 22, further comprising constricting said coil by energizing a magnetic field.

25. The method of coupling defined in claim 22, further comprising dividing said chamber into a pair of cavities of essentially equal volume and filling each said cavities with essentially the same number of said spheres.

26. The method of coupling defined in claim 25, further comprising dividing said chamber into cavities by encircling said shaft with a pair of axially movable conical components having their apex ends adjacent said shaft and adjacent each other.

27. The method of coupling defined in claim 26, further comprising decreasing the volume of said cavities by forcing said conical components axially away from each other along said shaft.

28. The method of coupling defined in claim 27, further comprising forcing said conical components axially away from each other by constricting said coil radially inwardly toward said shaft into contact with said conical components.

29. The method of coupling defined in claim 28, further comprising constricting said coil by energizing a magnetic field adjacent said coil.

30. The method of coupling a driving element to a driven element, one of said elements comprising a rotatable shaft, comprising the steps of:
   A. encircling said shaft with a strip of resilient material;
   B. coupling an innermost layer of said strip to said shaft;
   C. defining a coil by spiralling successive layers of said strip radially outwardly away from said shaft at increasingly greater radial distances from said shaft so that said innermost layer is the radially closest layer to said shaft, an outermost layer is the radially farthest layer from said shaft, and layers in between said innermost and outermost layers are each at different radial distances from said shaft;
   D. passing said shaft through a hole in the center of an axially movable conical component that is unattached to any other part;
   E. locating a universally movable coupling medium adjacent said elements;
   F. constricting said coil radially inwardly toward said shaft so that layers of said coil contact said unattached conical component and force said unattached conical component to move axially along said shaft into contact with said coupling medium until said coupling medium moves to transmit motion from said driving element to said driven element.

31. The method of coupling defined in claim 30, further comprising defining a chamber of predetermined volume around said portion, filing said chamber with a plurality of unattached universally movable spheres that provide said coupling medium, moving said conical component axially until said spheres rotate and are squeezed toward said shaft, maintaining rotation of said spheres until such rotation feeds back to said conical component and causes rotation of said conical component in the direction of rotation of said shaft so as to further constrict said coil until said coil binds against said conical component.

32. The method of coupling defined in claim 30, further comprising maintaining each layer of said coil spaced from every other layer at all times.

33. The method of coupling defined in claim 30, further comprising rotating said coupling medium against said conical component until said conical component also rotates and causes said layers of said coil contacting said conical component to bind thereagainst in locking engagement.

34. The method of coupling defined in claim 30, further comprising encircling said shaft with a pair of unattached axially movable conical components including said conical component; providing conical surfaces on opposite edges of said coil that mate with said conical components; and moving said conical components axially away from each other by constricting said coil radially inwardly toward said shaft.

35. The method of coupling defined in claim 34, further comprising surrounding a portion of said shaft with a wall so as to form a chamber of predetermined volume enclosing said portion; dividing said chamber into a pair of identical cavities with said conical components; and decreasing the volume of said cavities by moving said conical components away from each other.

36. The method of coupling defined in claim 35, further comprising filling said cavities with a plurality of unattached universally movable spheres for said coupling medium.

37. The method of coupling defined in claim 36, further comprising decreasing the volume of said cavities until said spheres begin to rotate, maintaining rotation of said spheres until such rotation feeds back to said conical components and causes said conical components to rotate in the direction of rotation of said shaft so as to further constrict said coil until said coil binds against said conical components.

38. The method of coupling defined in claim 30, further comprising constricting said coil by energizing a magnetic field adjacent said coil.

39. The method of coupling defined in claim 30, further comprising confining a plurality of unattached universally movable spheres in a chamber surrounding said elements, said spheres providing said coupling medium.

40. A coupling for connecting a rotatable driving element to a rotatable driven element comprising: a circular coil having means on its radially innermost end for coupling said coil to one of said elements; said coil spiralling radially outwardly from said radially innermost end around and radially outwardly away from said one element, said coil terminating in an outer end at the farthest distance of said coil from said one element; a circular ring of magnetic material surrounding said coil, said circular ring being split and having facing terminal ends that terminate adjacent each other; said outer end of said coil comprising a flap bent back in the opposite direction from the remainder of the spiral defined by said coil, said flap and said coil defining an open slot therebetween, said slot having an opening that faces said opposite direction, one of said terminal ends of said ring being received in said opening of said slot so as to connect said coil to said ring, a coupling medium adjacent said elements, and means for moving said ring and said coil so as to cause said coupling medium to transmit motion from said driving element to said driven element.

41. The coupling defined in claim 40, wherein said ring has an outer surface that defines its maximum diameter, said one end of said ring being tapered to a dimension less than said maximum diameter, said flap overlapping said one end of said ring and being tapered so that its outermost surface approximates said maximum diameter.

42. A coupling for connecting a rotatable driving shaft to a rotatable driven shaft, comprising:
   A. a housing attached to one of said shafts, said housing surrounding the other shaft so as to define a chamber of predetermined volume communicating with a surface of said other shaft;
   B. a plurality of unattached universally movable spheres within said chamber, each sphere having a predetermined volume that is a small fraction of said volume of said chamber; and
   C. means for forcing said spheres into contact with said surface of said other shaft and with said housing comprising:
      (1) a pair of conical components each having a center hole through which passes said other shaft, said conical components having their apex ends adjacent each other with their corresponding outside surfaces facing each other, said conical components being movable axially along said other shaft, and said conical components dividing said chamber into a pair of essentially identical cavities of essentially equal volume, and essentially the same number of said spheres filling each of said cavities;
      (2) a coil having one end connected to said other shaft between said conical components, said coil spiralling radially outwardly around and away from said other shaft from said one end to an opposite end, said coil comprising a tapered member that increases uniformly in width from said one end to said opposite end, and said coil having tapered opposite side edges, and each of said edges defining a portion of a pair of conical surfaces that are coaxial with said other shaft;
      (3) a split ring of magnetic material surrounding said coil and having one end connected to said opposite end of said coil, magnetic means for moving said one end in a direction that causes said coil to constrict radially inwardly toward said other shaft comprising an electromagnet having a core and windings oriented to move said one end of said split ring, a source of direct current connected to said windings, a switch for controlling flow of direct current to said windings, and a capicator connected to said source in parallel with said windings; and
      (4) radial constriction of said coil toward said shaft causing said conical surfaces defined by said coil to engage said outside surfaces of said conical components and to move said conical components axially along said other shaft and thereby decrease the size of said cavities and squeeze said spheres into torque transmitting contact with said other shaft and said housing.

* * * * *

UNITED STATES PATENT AND TRADEMARK OFFICE
CERTIFICATE OF CORRECTION

PATENT NO. : 5,163,873
DATED : November 17, 1992
INVENTOR(S) : James A. Mason

It is certified that error appears in the above-indentified patent and that said Letters Patent is hereby corrected as shown below:

Column 1 line 57, "posses" should --possess--.

Column 3 line 51, "sheel" should --shell--.

Column 7 line 15, "closer" should be --closest--.

Signed and Sealed this

Twenty-sixth Day of October, 1993

Attest:

BRUCE LEHMAN

Attesting Officer     Commissioner of Patents and Trademarks